Sept. 18, 1956 E. F. GILL ET AL 2,763,393

TAPE DISPENSER

Filed April 13, 1954

INVENTORS
EARLE F. GILL
JOHN S. MARRAN
ANTHONY J. ROMANO
BY: Ervin B. Steinberg
AGENT.

United States Patent Office 2,763,393

Patented Sept. 18, 1956

2,763,393

TAPE DISPENSER

Earle F. Gill, Washington, D. C., John S. Marran, Stamford, Conn., and Anthony J. Romano, Jamaica, N. Y., assignors to Chart-Pak, Incorporated, Stamford, Conn., a corporation of Connecticut Application April 13, 1954, Serial No. 422,745

1 Claim. (Cl. 216—20)

This invention relates to a device for holding and applying tape having one side thereof tacky so as to provide an adhesive surface without the use of any liquid or any other medium, whereby the tape may be caused to adhere to any surface by applying it thereto and pressing it down. Such tape is known commercially as "pressure sensitive tape."

This invention relates further to a tape dispenser which is held by the operator in a "pencil-like manner." The device is particularly suited for dispensing of comparatively narrow tape. i. e. tape from 1/32 inch width to about 3/4 inch width. It should be clearly understood however that these dimensions are not to be interpreted as limiting the scope of this invention inasmuch as the device may be found useful for tapes of larger or smaller width.

During the past few years pressure sensitive tapes of comparatively narrow width have been devised which are imprinted with colors, graphical symbols, pictographic representations, etc. for the purpose of producing statistical charts, engineering graphs, layout of offices or factories, and for many other visual aids. By the use of these tapes valuable drafting time is conserved and relatively inexperienced personnel is capable of producing graphs of highest quality which are ready for reproduction by various printing processes.

In connection with this work it is necessary to dispense tape easily and accurately in a straight or curved line or through pre-plotted points on a graph.

Heretofore most dispensers for this use have not been entirely successful in view of the fact that the comparatively thin tape had to be handled by the operator's fingers and the operator's fingers became wrapped by the tape itself so that some of the tape had to be lost in getting the tape initially applied to the surface before stringing it out thereover. Still further, the tape could not be applied accurately to the graph without a great amount of skill and diligence. Some other dispensers were found to be bulky and rather frequently would obstruct the immediate area of the graph to which the tape was to be applied.

One of the objects of this invention is to provide a tape dispenser which avoids one or more of the disadvantages of prior art devices.

Another object of this invention is the provision of a comparatively small and slender dispenser which may be manually held in a pencil-like manner.

A further object of the invention is to provide a tape dispenser which is threaded with tape to be dispensed in an easy and simple manner.

A still further object is the provision of a tape dispenser which dispenses tape directly to the surface to which the tape is applied and which will not obstruct the view at the surface.

One feature of the invention comprises a tape roll carrier and a foot which is adapted to dispense the tape. An intermediate portion connects said tape roll carrier with said foot and said intermediate portion is adapted to be manually retained in a pencil-like manner.

For a better understanding of the present invention, together with other and further objects thereof, reference is made to the following description taken in connection with the accompanying drawings in which.

Figure 1:
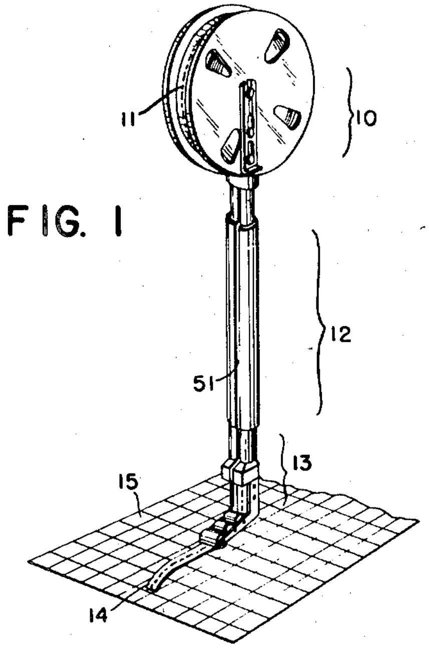
Figure 1 is a perspective view showing the dispenser applying tape to a graph.
Figure 2:
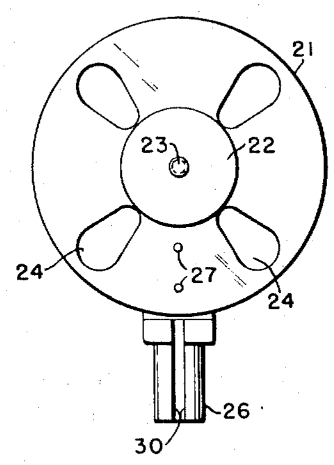
Figure 2 is a side elevation of the tape supporting means.
Figure 3:
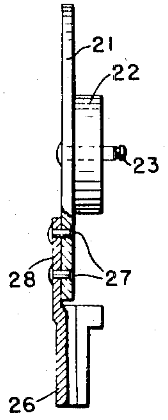
Figure 3 is a front elevation of Figure 2, partly in section.
Figure 4:
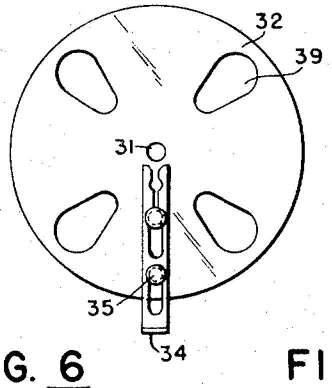
Figure 4 is a side elevation of a cover used in conjunction with the tape supporting means.
Figure 5:
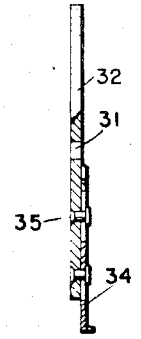
Figure 5 is a front elevation of Figure 4, partly in section.

Referring now to the figures and Figure 1 in particular, numeral 10 identifies means for supporting a roll of tape 11. A holder 12 connects the supporting means 10 with an angularly offset foot structure 13 which is adapted to dispense a strip of tape 14 to a chart 15. It will be noted that the dispenser, and specifically the holder 12, is constructed and shaped in such a manner as to be manually supported by the operator in a "pencil-like manner."

The detailed construction of the tape roll supporting means is depicted in Figures 2, 3, 4 and 5 wherein plate 21 is equipped with a centrally located circular core 22 for supporting a roll of tape, and with a central stud 23. Several apertures 24 are provided for inspecting the supply of tape which is to be dispensed.

At the lower end of plate 21 there is provided a tubular extension 26 which is secured to the plate by means of an integral flange portion 28 held in place by rivets 27. The tubular extension 26 is slotted longitudinally, the purpose of slot 30 will be explained later.

A central aperture 31 in cover plate 32 is adapted to engage stud 23 of plate 21. A slidable locking bar 34 held to cover plate 32 by means of rivets 35 will engage, when moved toward the center of the plate, an undercut in stud 23, thereby securing the cover plate 32 on stud 23 and restricting axial motion of a roll of tape. The apertures 39 in the cover plate serve the same purpose as apertures 24 mentioned above.

Figure 6:
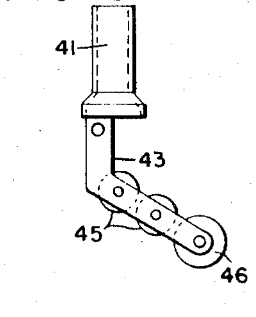
Figure 6 is a side elevation of the foot showing the relation of the tape dispensing means.
Figure 7:
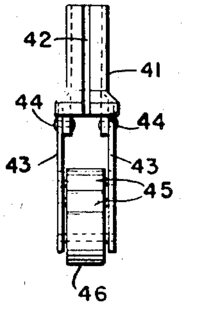
Figure 7 is a front elevation of Figure 6.

Figures 6 and 7 depict the foot portion of the dispenser. A tubular extension 41 having a longitudinal slot 42 supports two spaced side brackets 43 which are fastened to the extension by means of rivets 44. Two tape guide rollers 45 and a pressure roller 46 are rotatably supported between these side brackets. It has been found advantageous to furnish the pressure roller 46 of resilient material, such as hard rubber or phenolic material, while the guide rollers are made of metal.

Figure 8:
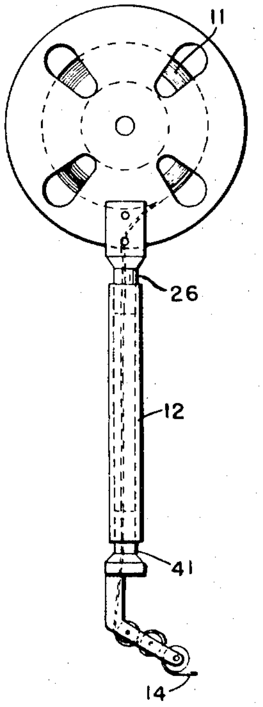
Figure 8 is a side elevation of the assembled dispenser.

The dispenser is shown in its assembled form in Figure 8. The substantially slender elongated holder 12, preferably made of tubing, with longitudinal slot 51 therein (Figure 1), telescopically engages the tape supporting means extension 26 at one end, and the tubular extension 41 of the foot at the other end. It will be apparent that by virtue of this telescopic engagement, the parts may slide in longitudinal as well as in radial direction with respect to another.

The operation of the instant dispenser is as follows: A roll of tape is installed on core 22. Then, slot 30 of extension 26 is aligned with slot 51 of holder 12, and also with slot 42 of foot extension 41. By virtue of these aligned slots tape 14 is inserted edgewise from the outside through the slots into the core of the tubular holder 12 and then threaded underneath the first guide roller, over the second guide roller and finally underneath the pressure roller (see Figure 8). As a final step, if desired, holder 12 is rotated a small amount so as to misalign the slots, thereby keeping the tape confined within the core of the holder.

For application of the tape, the operator manually supports the holder 12 in a pencil-like manner, brings tape 14 in contact with the surface to which the tape is to be applied and exerts pressure by means of roller 46 onto the tape and surface underneath. Then the tape is rolled onto the surface in a manner similar to drawing a pencil line across a sheet of paper.

It will be apparent that the tape to be dispensed does not come in contact with the operator but is dispensed directly onto the graph 15 (Figure 1). Still further, by virtue of the pencil-like construction of the dispenser, the device does not obstruct the operator's view of the graph or plot to which the tape is applied. This important feature is emphasized moreover, by arranging the foot portion of the dispenser in angularly displaced relationship with respect to the longitudinal axis of the holder. In this way the operator is capable of maintaining continuous eye contact with the immediate area to which the tape is applied, a feature which is of greatest importance when applying tape in a curved line through pre-plotted points.

It has been found advantageous to make the guide rollers 45 V-shaped in order that only the edges of the tape are contacted, thereby preventing adhesion of the tape to the surface of the guide rollers. It will, furthermore, be apparent to those skilled in the art that the internal circular aperture of holder 12 may be replaced by a wide longitudinal slot constructed in such a manner as to minimize possible adhesion of the tape.

While there have been described certain features and a specific embodiment of the invention, it will be obvious to those skilled in the art that various changes and modifications may be made therein without departing from the spirit and field of the invention which should be limited only by the scope of the appended claims.

What is claimed is:

A tape dispenser of the type described comprising means for supporting a roll of tape; said means having a slotted extension to permit passage of tape therethrough as the tape is unwound from said roll; said extension telescopically engaging one end of a tubular elongated holder; said holder being slotted along its length and adapted to be supported manually in a pencil like manner; the other end of said holder telescopically engaging a tubular slotted extension of a foot which is adapted to affix said tape to a surface; said foot being angularly offset with respect to the longitudinal axis of said holder; said foot including at least one guide roller for the tape and one pressure roller used for pressing the tape onto the surface to which it is being affixed; said tape supporting means with its slotted extension, said elongated slotted holder, and said foot with its slotted extension selectively rotatable with respect to one another to bring the three slots into mutual alignment for threading said tape therethrough and bring them into misalignment to retain the tape.

References Cited in the file of this patent

UNITED STATES PATENTS

| | | |
|---|---|---|
| 677,128 | Glenzinger | June 25, 1901 |
| 1,268,151 | Rettell | June 4, 1918 |
| 1,307,195 | Gardner | June 17, 1919 |
| 2,031,597 | Gray | Feb. 25, 1936 |